US006224790B1

(12) United States Patent
Ishida

(10) Patent No.: US 6,224,790 B1
(45) **Date of Patent: *May 1, 2001**

(54) CONDUCTIVE CERAMIC-METAL COMPOSITE BODY EXHIBITING POSITIVE TEMPERATURE COEFFICIENT BEHAVIOR

(75) Inventor: Yoshihiko Ishida, Nagoya (JP)

(73) Assignee: NGK Insulators, Ltd., Nagoya (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/324,263

(22) Filed: Jun. 2, 1999

(30) Foreign Application Priority Data

Jun. 22, 1998 (JP) ........................................ 10-191086

(51) Int. Cl.[7] ........................ H01B 1/02; C04B 35/00

(52) U.S. Cl. ............... 252/512; 252/521.1; 252/519.13; 252/62.9; 501/1

(58) Field of Search .............................. 252/500, 512, 252/519.13, 519.64, 520.22, 521.1; 501/1, 153

(56) References Cited

FOREIGN PATENT DOCUMENTS

| | | | |
|---|---|---|---|
| 0 862 191 A1 | | 9/1998 | (EP) . |
| 81010762B | * | 3/1981 | (JP) . |
| 62-214601 | | 9/1987 | (JP) . |
| 01222402 | * | 3/1988 | (JP) . |
| 7-161502 | | 6/1995 | (JP) . |
| 9-320811 | | 12/1997 | (JP) . |
| 98/11568 | | 3/1998 | (WO) . |

OTHER PUBLICATIONS

T. Sawaguchi, et al., "Effect of Microstructure of Bismuth Metal Particle Filled Ceramic Composite on the PTCR Property," Proceedings of the Annual Meeting, 1998, The Ceramic Society of Japan, Mar. 3, 1998, p. 319.

T. Sawaguchi, et al., "Effect of Resistivity of the Matrix Ceramics in Bismuth Metal Particle Filled Ceramic Composite on the PTCR Property," Proceedings of the Fall Meeting, 1997, The Ceramic Society of Japan, Oct. 2, 1997, vol. 10, p. 197.

T. Sawaguchi, et al., "The PTCR Property of the Bismuth Metal Particle Filled Ceramic Composite Sintered by Hot Pressing," Proceedings of the Fall Meeting, 1998, The Ceramic Society of Japan, Oct. 1, 1998, vol. 11, p. 106.

* cited by examiner

*Primary Examiner*—Yogendra Gupta
*Assistant Examiner*—Derrick G Hamiln
(74) *Attorney, Agent, or Firm*—Burr & Brown

(57) ABSTRACT

A conductive composite sintered body exhibiting PTC behavior, including a high electrical resistance matrix and 20 vol %–40 vol % electrically conductive particles dispersed in the matrix to form an electrically conducting three-dimensional network therethrough. The electrically conductive particles are selected from bismuth, gallium, or alloys thereof, and an average distance between the particles, when viewed in an arbitrary cross-section through the sintered body, is no more than 8 times the average particle diameter of the particles. The resistivity of the sintered body is low at temperatures below the melting point of the electrically conductive material and increases substantially at or above the melting point.

13 Claims, 8 Drawing Sheets

CONDUCTIVE CERAMIC-METAL COMPOSITE BODY EXHIBITING POSITIVE TEMPERATURE COEFFICIENT BEHAVIOR

BACKGROUND OF THE INVENTION

The present invention relates to a conductive ceramic-metal composite body exhibiting positive temperature coefficient (PTC) behavior, which is used to protect electrical and electronic components from damage due to overcurrent conditions.

It is known that ceramic materials which exhibit PTC behavior/characteristics can be used to protect electrical and electronic components against overcurrent conditions, because the resistivity of those materials increases dramatically at specific temperatures. Traditionally, materials like barium titanate have been used in this regard, because the material exhibits an exponential increase in resistivity at its Curie point temperature. However, such materials also have relatively low conductivity at room temperature, thus rendering them unsuitable for many applications, such as consumer electronics.

In view of the drawbacks associated with barium titanate PTC products, the industry has turned to polymer PTC materials for use in electronic components where currents of several tens of milliamperes can be expected. In such polymer materials, conductive particles are dispersed in a polymer matrix to form a conductive path from one side of the matrix to the other. When an overcurrent condition occurs, the polymer matrix is heated above its phase transition temperature (e.g., 120° C. for polyethylene), at which time the volume of the polymer matrix expands and disrupts the conductive path of particles formed therethrough. As a result, the resistivity of the overall material increases substantially and thus prevents the overcurrent condition from damaging downstream electronic components. These materials are attractive in that they have high conductivity and high insulation breakdown strength at room temperature.

One drawback associated with polymer PTC devices is that the trip-point temperature of the device is dictated solely by the phase transition temperature of the polymer used as the matrix. In the case of polyethylene, the phase transition temperature of that polymer material is about 120° C. and thus the trip-point temperature of any PTC device made of polyethylene is limited to about 120° C. Consequently, it is difficult to change the trip-point temperature to account for different overcurrent conditions in different electronic devices.

Another drawback associated with polymer PTC devices is that the PTC effect occurs due to a phase transformation in the matrix material itself, and not in the conductive particles held within the matrix. Accordingly, every time the matrix goes through a phase transformation, the network of conductive particles changes. Consequently, the room temperature resistivity after a trip condition rarely matches the room temperature resistivity before the trip condition. This is undesirable, since circuit designers would like the room temperature resistivity of the PTC device to be the same after every trip condition.

Yet another drawback associated with polymer PTC devices is that, in severe overcurrent conditions, the polymer matrix material can be decomposed to elemental carbon thus leaving a permanent conductive path through the device. Such a permanent conductive path, of course, would allow the overcurrent condition to reach downstream electronic components.

There have been recent reports of ceramic-metal composite PTC devices wherein metal particles, such as bismuth, are disposed in a ceramic matrix to form a conductive path therethrough. Materials such as silica and alumina have been used as the matrix material for these composites, and it is has been demonstrated that these composites show an exponential increase in resistivity at about 280° C. However, the room temperature resistivity is on the order of 1000 Ω·cm, which is much too high for use in practical applications. Acceptably low room temperature resistivities have been realized only by using semi-insulating materials for the matrix.

SUMMARY OF THE INVENTION

It is an object of the present invention to provide a conductive composite (preferably ceramic-metal composite) body that exhibits PTC behavior over a wide range of selectable temperatures, and exhibits sufficiently low room temperature resistivity so as to allow its use in the protection of high current electrical and electronic components.

To meet the above-stated object, the inventor discovered that a specific relationship between the average distance between the conductive particles dispersed in the insulating matrix and the average particle diameter of those particles must exist in order for sufficiently low room temperature resistivity to be realized. At the same time, this relationship ensures an exponential increase in resistivity at specific trip point temperatures, and the ratio between the high temperature resistivity and the room temperature resistivity can easily exceed 10, 100, or more.

In accordance with one embodiment of the present invention, the conductive composite sintered body includes a high electrical resistance matrix and 20 vol %–40 vol % electrically conductive particles dispersed in the matrix to form an electrically conducting three-dimensional network therethrough. The particles are selected from bismuth, gallium, or alloys thereof. An average distance between the particles, when viewed in an arbitrary cross-section through the sintered body, is no more than 8 times, preferably no more than 4 times, the average particle diameter of the particles. The resistivity of the sintered body is low at temperatures below the melting point of the electrically conductive material and increases substantially at or above the melting point.

Preferably, the resistivity of the sintered body is no more than 5 Ωcm below the melting point of the electrically conductive material and at least 1 kΩcm at or above the melting point of the electrically conductive material.

BRIEF DESCRIPTION OF THE DRAWINGS

For a fuller understanding of the nature and objects of the invention, reference should be made to the following detailed description of a preferred mode of practicing the invention, read in connection with the accompanying drawings, in which.

DETAILED DESCRIPTION OF THE INVENTION

The conductive composite body of the present invention includes a matrix composed of a high electrical resistance material (i.e., electrically insulating material) and a plurality of conductive particles dispersed therein defining a 3-dimensional conductive network structure through the matrix. The high electrical resistance material is preferably selected from ceramic oxides, ceramic nitrides, silicate glasses, borate glasses, phosphate glasses and aluminate glasses. Alumina, silica, magnesia and mullite are more specific examples of ceramic oxides. Aluminum nitride and silicon nitride are more specific examples of ceramic nitrides. Sodium silicate glass, potassium borate glass and sodium phosphate glass are more specific examples of glass materials that can be used to form the matrix.

The material for the conductive particles can be any conductive material that exhibits a decrease in volume at or above its melting point temperature. For example, bismuth, gallium and alloys containing at least one of these metals can be used. Metals such as antimony, lead, tin and zinc are examples of metals that form alloys with bismuth and/or gallium, which alloys shrink at their respective melting points. Metal elements, such as indium, that form intermetallic compounds when combined with bismuth and/or gallium do not provide alloys that shrink when melted.

Figure 1:
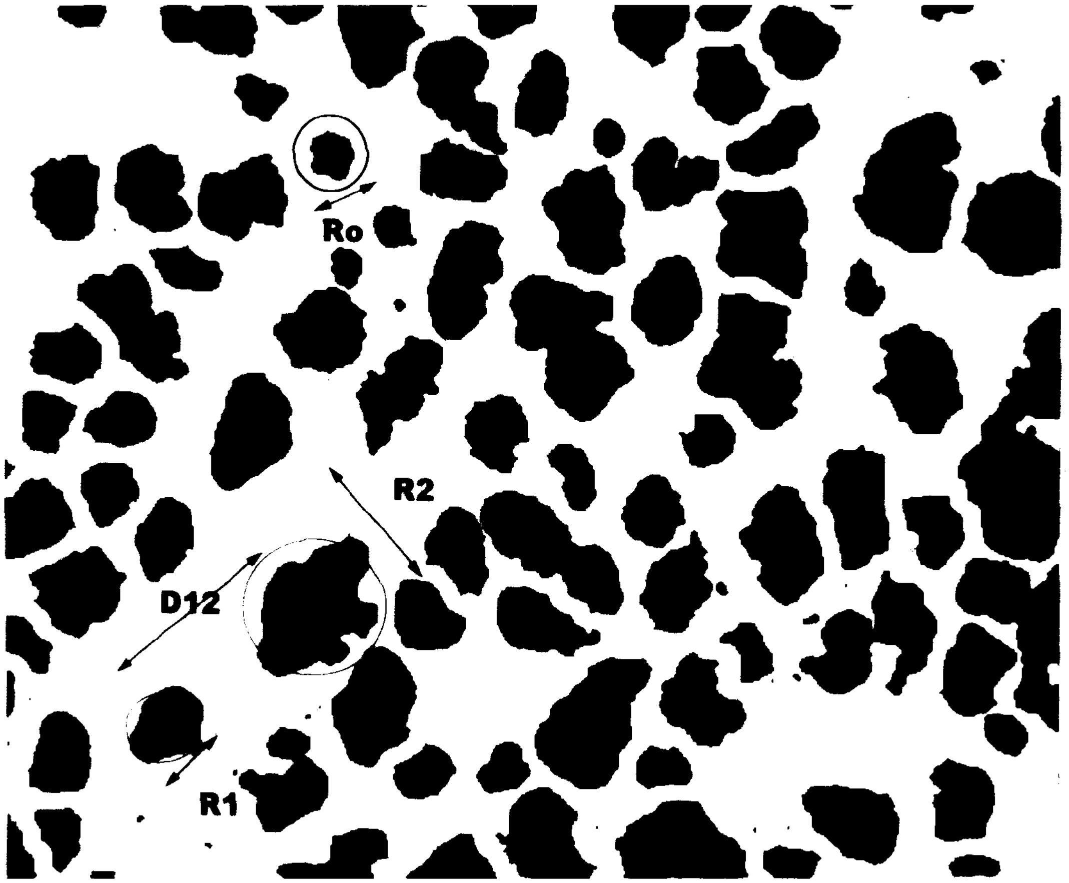
FIG. 1 is an SEM microphotograph showing the dispersion of conductive particles in the high electrical resistance material matrix, to demonstrate the calculation of average particle diameter and average distance between particles.
Figure 2:
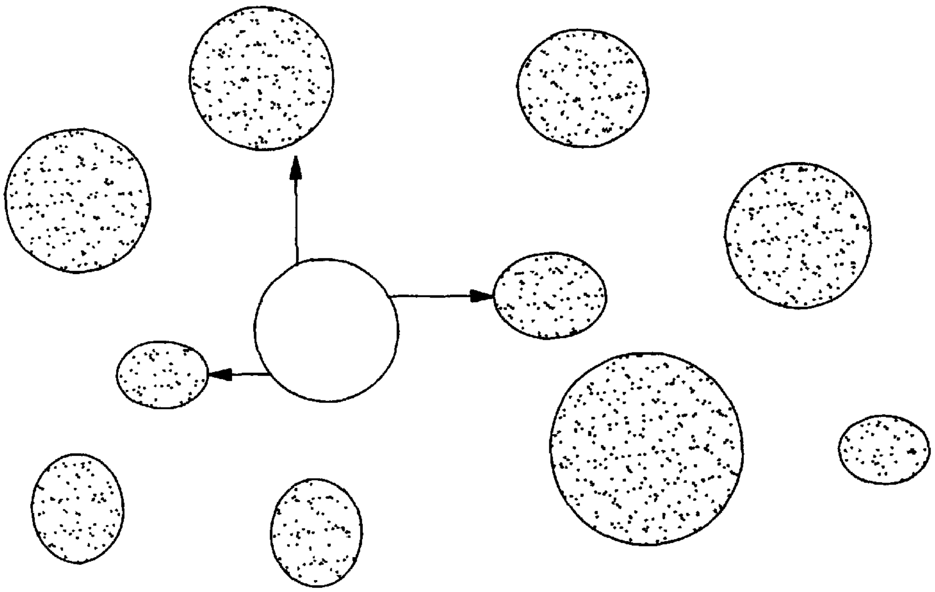
FIG. 2 is an explanatory drawing explaining the selection criterium for determining average distance between particles.

Reference is made to FIGS. 1 and 2 to explain how the "average particle diameter" of the conductive particles and the "average distance" between the conductive particles are determined. The "particle diameter" of a conductive particle is defined as the diameter (R) of a circle having an area equal to the cross sectional area of the particle taken in an arbitrary cross section of the sintered body. The "average particle diameter" of the conductive particles is defined as the average value of the diameters of all particles observed in the arbitrary cross section. These definitions apply herein unless otherwise stated.

To determine the distance (L) between conductive particles, two adjacent arbitrary particles are selected in an arbitrary cross-section of the sintered body. Circles, having areas equal to the cross-sectional areas of the respective particles, are then inscribed around the adjacent particles. As explained above, the particle diameter of these particles are equal to the diameters ($R_1$ and $R_2$) of the inscribed circles, respectively. The distance between the centers of these two inscribed circles is represented by $D_{12}$, and the distance between the two particles, $L_{12}$, is calculated as follows:

$$L_{12} = D_{12} - \frac{(R_1 + R_2)}{2}$$

The distance $L_{12}$ is actually the distance between the sides of the inscribed circles, not the centers of those circles.

In order to determine the "average distance" between particles in this arbitrary cross-section, a target particle is selected and the distance, L, between the target particle and three of the closest adjacent particles is calculated, as shown in FIG. 2, for example. The average distance between the target particle and each of the adjacent three particles is determined by adding the three respective L values and then dividing by 3.

As will be explained later herein, the volume ratio of the matrix material (formed of the high electrical resistance material) and the conductive particles dispersed therein is important to establish acceptably low room temperature resistivity (i.e., less than 5 Ωcm) and acceptably high resistivity at the trip point temperature of the material. The volume ratio of the matrix and the conductive particles is measured as explained below.

Volume V1 of the overall sintered body is measured by the Archimedes method. The same sintered body is then immersed in an 1N nitrate aqueous solution for 24 hours to remove the conductive particles from the sintered composite body. The matrix material, which now takes the form of a porous body of high electrical resistance material, is then pulverized and the volume thereof is measured by the Archimedes method. The volume of the matrix material so measured is designated V2.

The volume ratio of the matrix and the conductive particles is then calculated from the measured values V1 and V2. That is, the volume ratio of the conductive particles is equal to (V1−V2)/V1×100, and the volume ratio of the matrix material is equal to V2/V1×100.

It will be apparent to those skilled in the art that other solutions could be used to remove the electrically conductive particles. Sulfuric acid is but one example.

It is preferred that the volume ratio of conductive particles in the sintered composite body ranges from 20% to 40%, more preferably 25% to 35%. As explained above, the volume ratio of conductive particles contained in the sintered composite body is important to achieve sufficiently low room temperature resistivity and sufficiently high resistivity at the trip point temperature of the material.

It is also important that the electrically conductive particles are dispersed uniformly throughout the matrix of high electrical resistance material in order to obtain each of the characteristics explained above. Good particle distribution must be maintained not only during mixing of the raw materials, but also in the intermediate, pre-sintered body.

The average particle diameter of the primary particles of high electrical resistance material (which are aggregated to form secondary particles as discussed below) preferably ranges from 0.8 microns to 10 microns. If the average diameter of the primary particles exceeds 10 microns, it is difficult to control the particle diameter of the secondary particles during wet or dry processing so that the average diameter thereof does not exceed 8 times, preferably 4 times, the particle diameters of the primary particles of electrically conductive material, as discussed below.

As explained above, the sintered composite body of the present invention exhibits PTC behavior due to volumetric shrinkage of the electrically conductive particles at or above the melting point temperature thereof. It is preferred that the electrically conductive particles undergo a volume shrinkage of at least 0.5% in order to establish reliable PTC behavior in the material (more preferably at least 1.0%). Bismuth metal shrinks about 3.2 volume percent at its melting point, which is more than enough to ensure good PTC behavior. Accordingly, the bismuth metal could be alloyed with other metals, such as those described above, to modify the melting temperature of the alloy and consequently reduce the amount of volume shrinkage where appropriate. Again, however, the electrically conductive particles should undergo a volume shrinkage of at least 0.5%.

The average particle diameter of the primary particles of electrically conductive material can range from 0.5 microns to 100 microns, but should be selected to ensure that the above-discussed relationship between the particle diameter of primary particles of electrically conductive material and average particle diameter of secondary particles of high electrical resistance material is realized.

While the average particle size of the primary particles of electrically conductive material can range from 0.5 to 100 microns, the particle size distribution (using the dry classification method) should be as narrow as possible. This will ensure that the sintered body exhibits good electrical insulation properties in the high resistivity state, and will also ensure that a very steep increase in resistivity occurs at the trip point temperature of the device. A narrow particle size distribution also ensures uniform distribution of the electrically conductive particles in the sintered composite body. Again, such good distribution is important to provide acceptably low room temperature resistivity and acceptably high resistivity in a trip condition.

In addition to the components described above, the sintered composite body can also include reinforcing members, such as alumina fibers and/or silicon nitride whiskers, in order to increase the mechanical strength of the composite sintered body. The addition of these materials should not exceed about 5 volume percent in order to not adversely affect the electrical properties of the body.

Additionally, materials such as boron nitride, which have a lower heat capacity than that of the high electrical resistance material comprising the matrix, can be added to the sintered composite body to reduce the overall heat capacity thereof. Such an addition would make the device more responsive as it would take less energy to heat the device to the trip point temperature of the electrically conductive particles dispersed therein.

Still further, a second electrically conductive particle component could be contained in the composite sintered body to shift the trip point temperature of the device without having to change the composition of the primary electrically conductive particle component. For example, a low melting point alloy, such as an indium alloy, could be dispersed throughout the matrix along with a primary electrical conductive component such as bismuth. In an overcurrent condition, heat would be generated in the sintered body. The indium alloy particles would melt first, due to their lower melting point temperature, to absorb some of the heat generated by the overcurrent condition. The indium alloy particles would act as a heat sink for the overall device, and thus the device would require more overall heat to cause the bismuth particles to melt. Accordingly, the trip point energy generated by the electric current passing through the device could be increased without changing the composition of the bismuth particles.

In forming the composite body of the present invention, the raw materials can be processed either through dry processing techniques or through wet processing techniques, each of which, although well known in the art, will be briefly explained below.

When using dry processing techniques, a raw material containing both the high electrical resistance material and the electrically conductive particles is prepared as a slurry and thereafter spray-dried to form granules (containing both materials) that are easy to handle and press mechanically. Before formation of the slurry, however, the powder that forms the high electrical resistance material, which is typically in the form of secondary particles (aggregations of primary particles), is pulverized to such an extent that the average diameter of the secondary particles is no more than 8 times, preferably no more than 4 times, the average diameter of the primary particles of electrically conductive particles contained in the raw material used to form the slurry. This will insure good, uniform spacing between the conductive particles (when viewed in an arbitrary cross-section of the sintered body).

When using wet processing techniques, such as extrusion, a raw material batch composed primarily of a mixture of the high electrical resistance material and the electrically conductive particles is prepared with the addition of standard secondary raw materials such as water, organic solvents and organic binders. As in the spray drying techniques explained above, it is necessary for the conductive particles to be dispersed uniformly in the batch material as primary particles, and usually necessary for the high electrical resistance material to be pulverized to control the diameter of the secondary particles. To the extent any secondary raw materials are included in particulate form, those particles also should be in the form of secondary particles. In all instances, the secondary particles of high electrical resistance material (and secondary raw materials) should be pulverized so that the average diameters thereof are no more than 8 times, and preferably no more than 4 times, the average of primary particles of electrically conductive material. Again, this will insure that the electrically conductive particles in the final sintered body are appropriately distributed, as described in more detail below.

When using either of the dry or wet processing techniques described above, it is preferable to perform test batches to ensure that the particle sizes of the secondary particles satisfy the above relationships with respect to the size of the primary particles of conductive material before initiating large scale production of composite material.

When forming the raw material batch to be extruded, the raw materials are combined and kneaded using a vacuum kneader, in accordance with well-known ceramic processing techniques. It is preferable to use an organic binder to assist the kneading operation. Examples of such organic binders include methyl cellulose and polyvinyl alcohol. These materials should be present in the raw material batch in an amount of 1–5 weight percent relative to the total weight of the batch material.

A deflocculant should also be used, and examples of deflocculants include complex salts of phosphoric acid, allyl sulfonate and sodium thiosulfonate. The deflocculant used will depend largely upon the composition of the high electrical resistance material, as will be apparent to one skilled in the art.

It is also preferable to include a sintering aid in the raw material to reduce the sintering temperature. Sintering aids such as silicate glass, borate glass, phosphate glass and aluminate glass are examples of acceptable sintering aids. The sintering aid can be in the form of a frit, a colloidal suspension, or an alkoxide compound that forms a glass during the sintering operation. The sintering aid forms a liquid phase between the particles of the composite to reduce the sintering temperature, facilitate densification and prevent vaporization of the conductive particles.

Once the composite material is formed into the desired shape, it is sintered preferably using a two-stage sintering process. A preliminary sintering is performed at a relatively low temperature, followed by a primary sintering performed at a relatively high temperature. It is apparent to one skilled in the art that sintering times and temperatures will depend upon the high electrical resistance material used to form the matrix, but usually the preliminary sintering temperature ranges from 650° C. to 900° C. for 1 to 10 hours, and the primary sintering temperature ranges from 1250° C. to 1500° C. for 1 to 4 hours. The preliminary sintering step at low temperature assists in creating a uniform microstructure of high electrical resistance particles in the final sintered body. In this regard, as discussed above, the average particle diameter of the primary particles making up the secondary particles of high electrical resistance material should range from 0.8 microns to 10 microns in order to achieve uniform sintering of the entire composite body.

It is preferred that sintering is performed in the presence of an inert gas, such as nitrogen, in order to prevent oxidation of the electrically conductive particles. Preferably, nitrogen is supplied during sintering at an oxygen partial pressure of $10^{-4}$ atmosphere or less. While nitrogen can be used in both the preliminary and primary sintering steps, it is preferred that the preliminary sintering step instead use hydrogen gas at an oxygen partial pressure of $10^{-20}$ atmospheres or less. These sintering atmospheres, again, help to prevent oxidation of the electrically conductive particles within the composite body.

Once the composite material is formed into a sintered body, termination electrodes are formed on opposed surfaces thereof. The remaining surfaces of the sintered body preferably are covered with a highly insulating inorganic material to prevent edge short circuiting and to improve the overall breakdown strength of the device. Materials such as ceramic oxides, ceramic nitrides, silicate glass, borate glass, phosphate glass, and the like, could be used for the covering.

In order that the present invention can be better understood, the following examples are provided merely by way of illustration.

EXAMPLE I

Mullite powder (average primary particle diameter=1.5 μm; average secondary particle diameter=3 μm) was used as the high electrical resistance material and bismuth metal (average primary particle diameter=20 μm) was used as the electrically conductive material in mixing proportions shown in Table 1. A sintering aid of $ZnO—B_2O_3—SiO_2$ was added in an amount of 3.0% by volume. The mixture of these materials was kneaded with a vacuum kneader and, after kneading, extruded using a vacuum extrusion formation device. The extruded bodies were dried at 100° C. and then preliminarily sintered at 700° C. for 3 hours in a nitrogen gas flow of 5 l/minute. Thereafter, the bodies were primarily sintered at 1250° C. for 3 hours in the same atmosphere to form composite sintered bodies.

The volume ratio of the electrically insulating matrix and the conductive material in each of the sintered bodies was measured by eluting the conductive material using a 1N hydrochloric acid aqueous solution. The volume percentage of each material is shown in Table 1.

The sintered products obtained were processed into 5 mm×5 mm×30 mm cylinders and the room temperature resistivity and temperature dependency of resistivity were measured by the direct current-four terminal method. The results are shown in Table 1.

Figure 3:
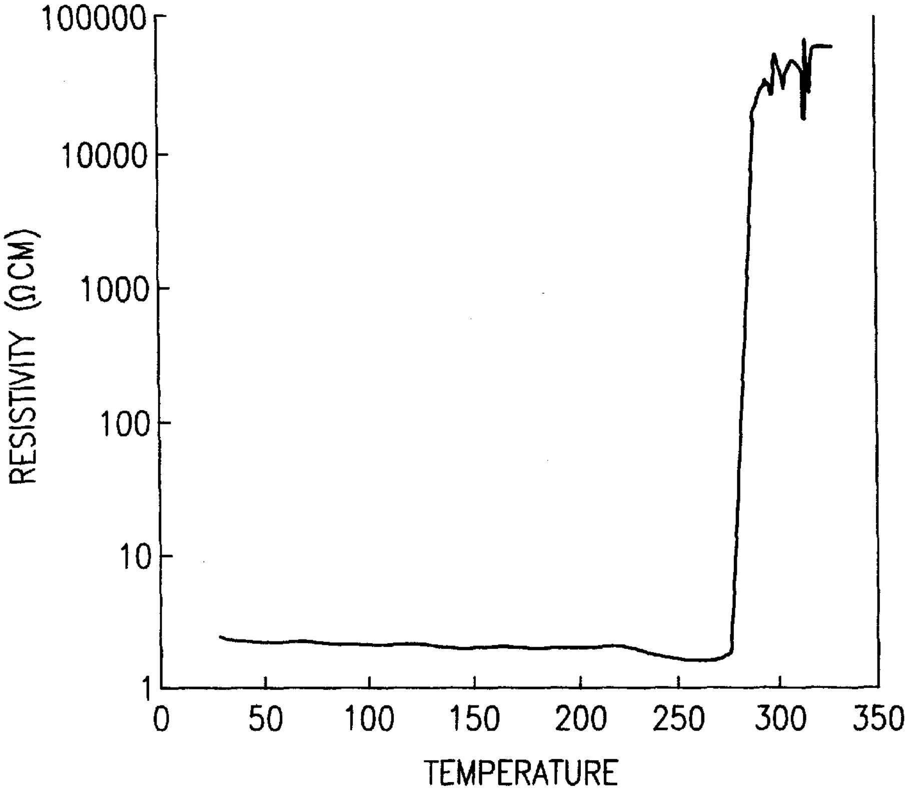
FIG. 3 is a graph showing the relationship between resistivity and device temperature for Example 1-7.
Figure 4:
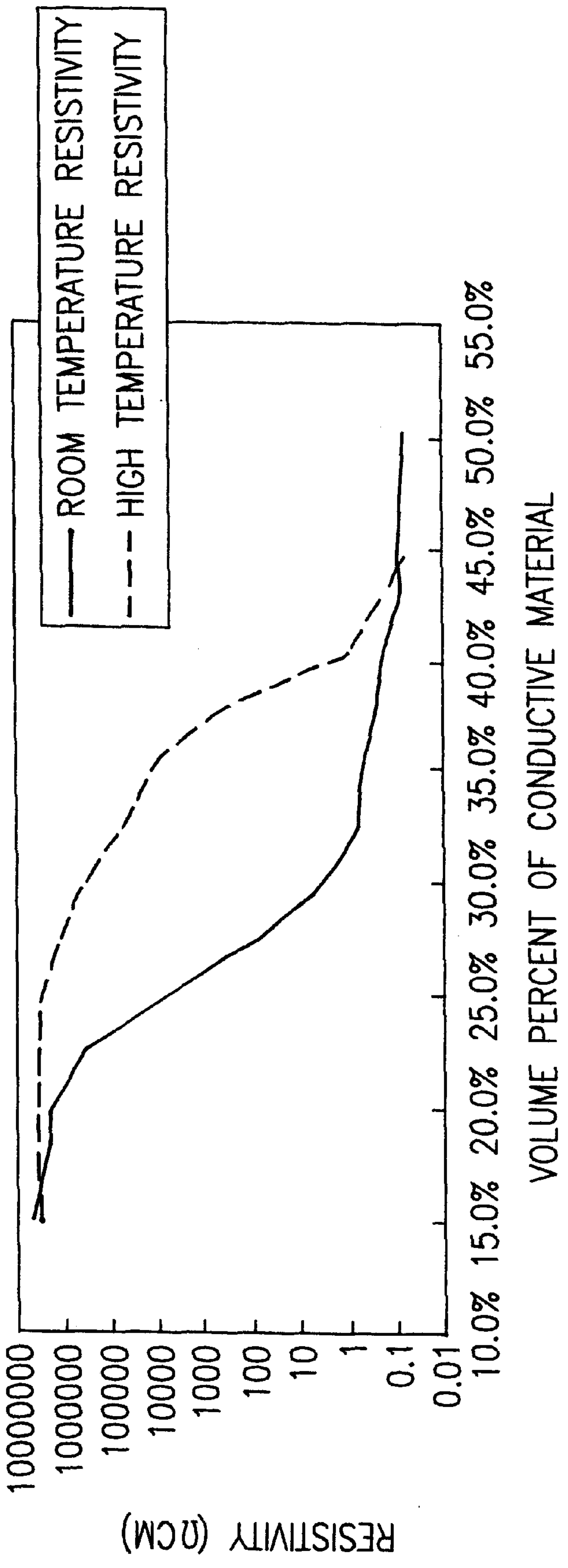
FIG. 4 is a graph showing the relationship of room temperature resistivity and high temperature resistivity as a function of conductive material volume percent for the conductive composite bodies of Examples 1-1 through 1-14.
Figure 5:
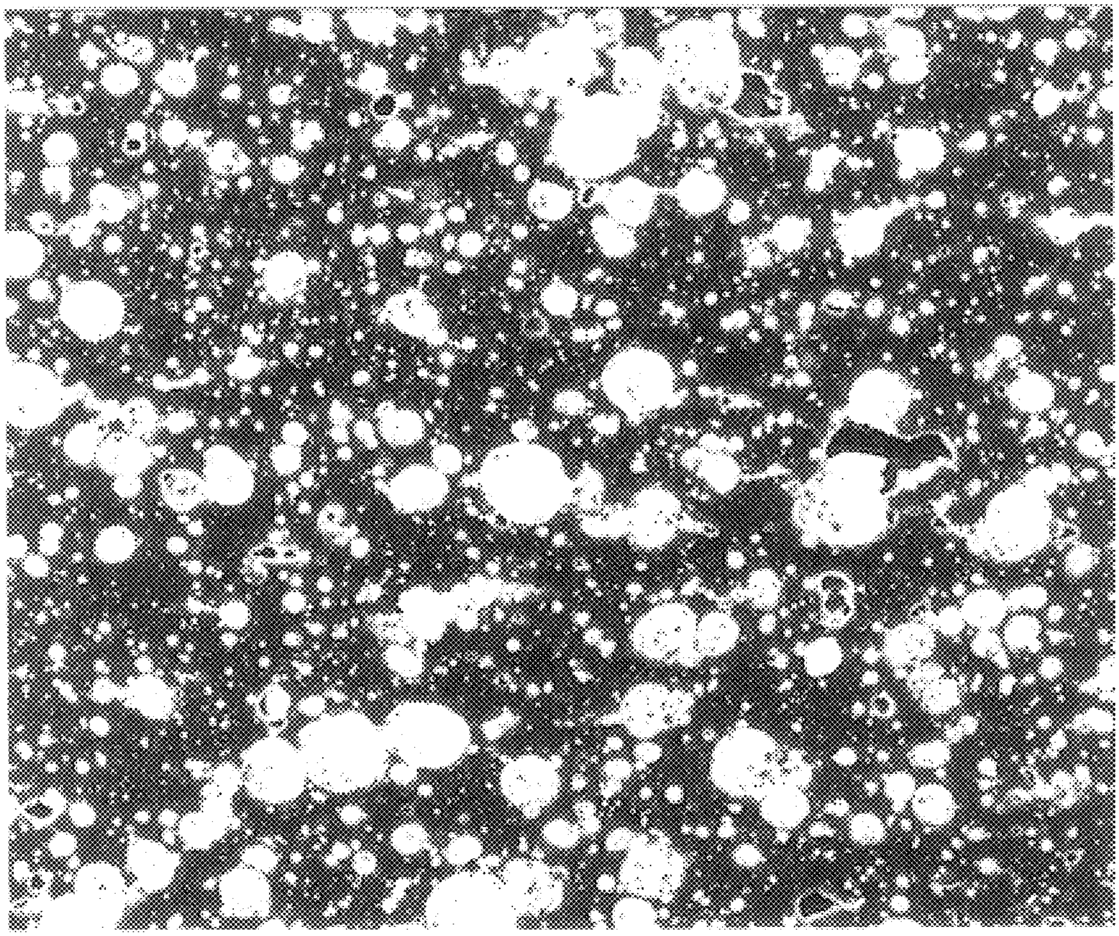
FIG. 5 is an SEM microphotograph of the sintered body according to Example 1-1.
Figure 6:
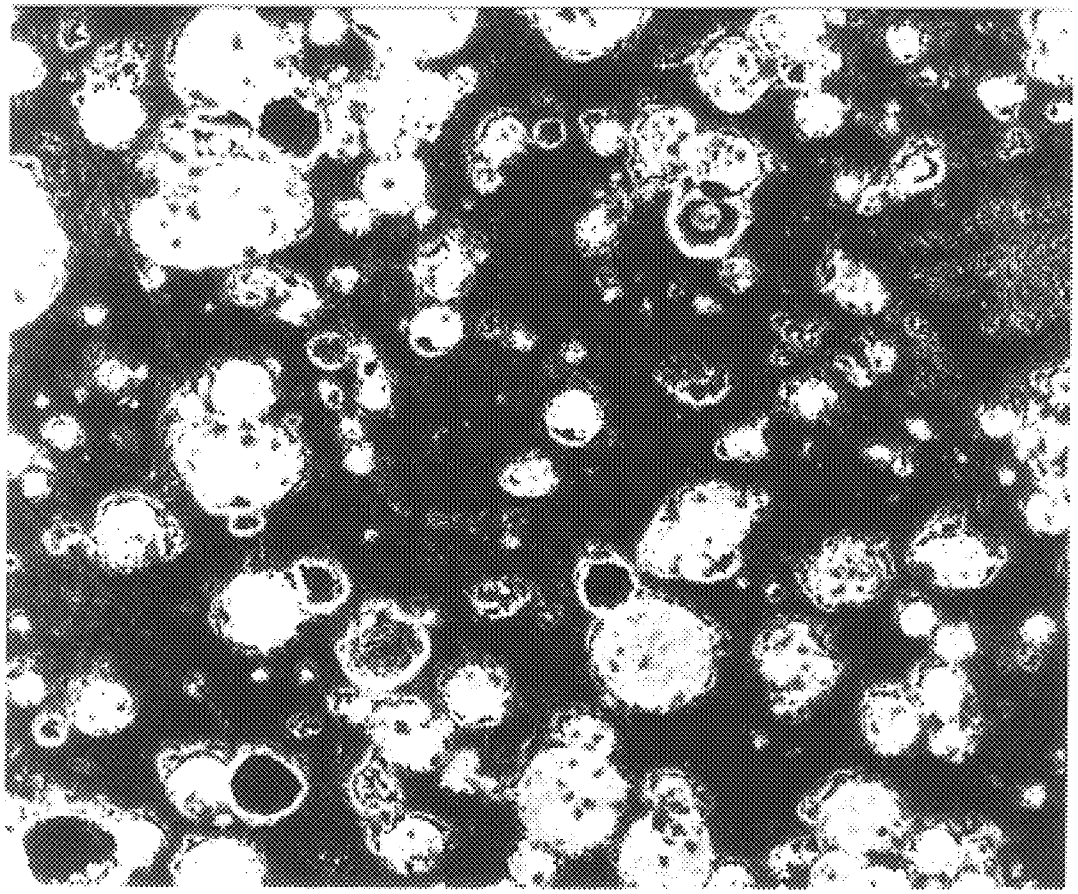
FIG. 6 is an SEM microphotograph of the sintered body according to Example 1-7.

The relationship between measured resistivity and temperature for the sintered body of Example 1-7 is shown in FIG. 3. The relationship between resistivity at room temperature and high temperature for the sintered bodies of Examples 1-1 through 1-15 is shown in FIG. 4, where the volume ratio of conductive material is plotted on the horizonal axis and resistivity on the vertical axis. Examples 1-1 through 1-3 and 1-11 through 1-15 are comparative examples, as the volume percent of conductive material in the sintered body is less than 20 vol % or more than 40 vol %. FIGS. 5 and 6 are SEM microphotographs of the microstructures of an arbitrary cross-section of the sintered body of Examples 1-1 and 1-7, respectively.

TABLE 1

| Example Number | High Electrical Resistance Material: Composition | High Electrical Resistance Material: Volume | Conductive Material: Composition | Conductive Material: Volume | Composition of Sintered Body: Conductive Material Volume | Composition of Sintered Body: Matrix Volume | Resistivity (Ω · cm): Room Temperature | Resistivity (Ω · cm): 320° C. |
|---|---|---|---|---|---|---|---|---|
| I-1 | Mullite | 82.0% | Bi metal | 15.0% | 14.9% | 85.1% | $4.12 \times 10^6$ | $2.56 \times 10^6$ |
| I-2 | Mullite | 79.5% | Bi metal | 17.5% | 17.2% | 82.8% | $2.12 \times 10^6$ | $3.96 \times 10^6$ |
| I-3 | Mullite | 77.0% | Bi metal | 20.0% | 19.8% | 80.2% | $1.85 \times 10^6$ | $3.25 \times 10^6$ |
| I-4 | Mullite | 74.5% | Bi metal | 22.5% | 22.6% | 77.4% | $3.12 \times 10^5$ | $3.54 \times 10^6$ |
| I-5 | Mullite | 72.0% | Bi metal | 25.0% | 24.6% | 75.4% | $8.98 \times 10^3$ | $3.06 \times 10^6$ |
| I-6 | Mullite | 69.5% | Bi metal | 27.5% | 27.2% | 72.8% | $9.50 \times 10^1$ | $1.28 \times 10^6$ |
| I-7 | Mullite | 67.0% | Bi metal | 30.0% | 29.6% | 70.4% | 4.52 | $5.20 \times 10^5$ |
| I-8 | Mullite | 64.5% | Bi metal | 32.5% | 32.5% | 67.5% | $8.00 \times 10^{-1}$ | $5.53 \times 10^4$ |
| I-9 | Mullite | 62.0% | Bi metal | 35.0% | 35.1% | 64.9% | $6.50 \times 10^{-1}$ | $1.26 \times 10^4$ |
| I-10 | Mullite | 59.5% | Bi metal | 37.5% | 37.3% | 62.7% | $3.20 \times 10^{-1}$ | $4.90 \times 10^2$ |
| I-11 | Mullite | 57.0% | Bi metal | 40.0% | 40.2% | 59.8% | $2.40 \times 10^{-1}$ | 1.12 |
| I-12 | Mullite | 54.5% | Bi metal | 42.5% | 42.4% | 57.6% | $8.56 \times 10^{-2}$ | $2.01 \times 10^{-1}$ |
| I-13 | Mullite | 52.0% | Bi metal | 45.0% | 44.7% | 55.3% | $1.05 \times 10^{-1}$ | $6.61 \times 10^{-2}$ |
| I-14 | Mullite | 49.5% | Bi metal | 47.5% | 47.2% | 52.8% | $7.62 \times 10^{-2}$ | $5.61 \times 10^{-2}$ |
| I-15 | Mullite | 47.0% | Bi metal | 50.0% | 50.1% | 49.9% | $6.52 \times 10^{-2}$ | $5.21 \times 10^{-2}$ |

EXAMPLE II

Alumina powder (average primary particle diameter=1.1 μm; average secondary particle diameter=3 μm) was used as the high electrical resistance material and bismuth alloy (20 mol %)-gallium (80 mol %) (average primary particle diameter=25 μm) was used as the electrically conductive material in the mixing proportions shown in Table 2. The electrically conductive material was formed by atomization of the molten alloy in a non-oxidizing atmosphere. A sintering aid of ZnO—$B_2O_3$—$SiO_2$ was added in an amount of 3.0% by volume, in addition to 0.5 parts by weight sodium thiosulfate (deflocculant), 3 parts by weight methyl cellulose (water-soluble organic binder), and 60 parts by weight distilled water. These materials were then kneaded to obtain a slurry, which was thereafter spray dried to form 0.1 mm diameter granules (that contained both electrically conductive material and high electrical resistance material). The manufactured particles were then inserted into a metal mold and press formed into molded bodies. The bodies were then further pressure formed at a pressure of 7 ton/cm$^2$ with a hydrostatic-pressure, rubber-press machine.

The formed bodies were then dried at 100° C. and then preliminarily sintered at 900° C. for 4 hours in a hydrogen gas (reducing gas) flow of 5 l/minute. Thereafter, the bodies were primarily sintered at 1400° C. for 4 hours in a nitrogen atmosphere to form composite sintered bodies.

The volume ratio of the electrically insulating matrix and the conductive material in each of the sintered bodies was measured by eluting the conductive material using a 1N hydrochloric acid aqueous solution. The volume percentage of each material is shown in Table 2. The room temperature resistivity and temperature dependency of resistivity were measured for each body in the same manner as in Example I. The results are shown in Table 2.

Figure 7:
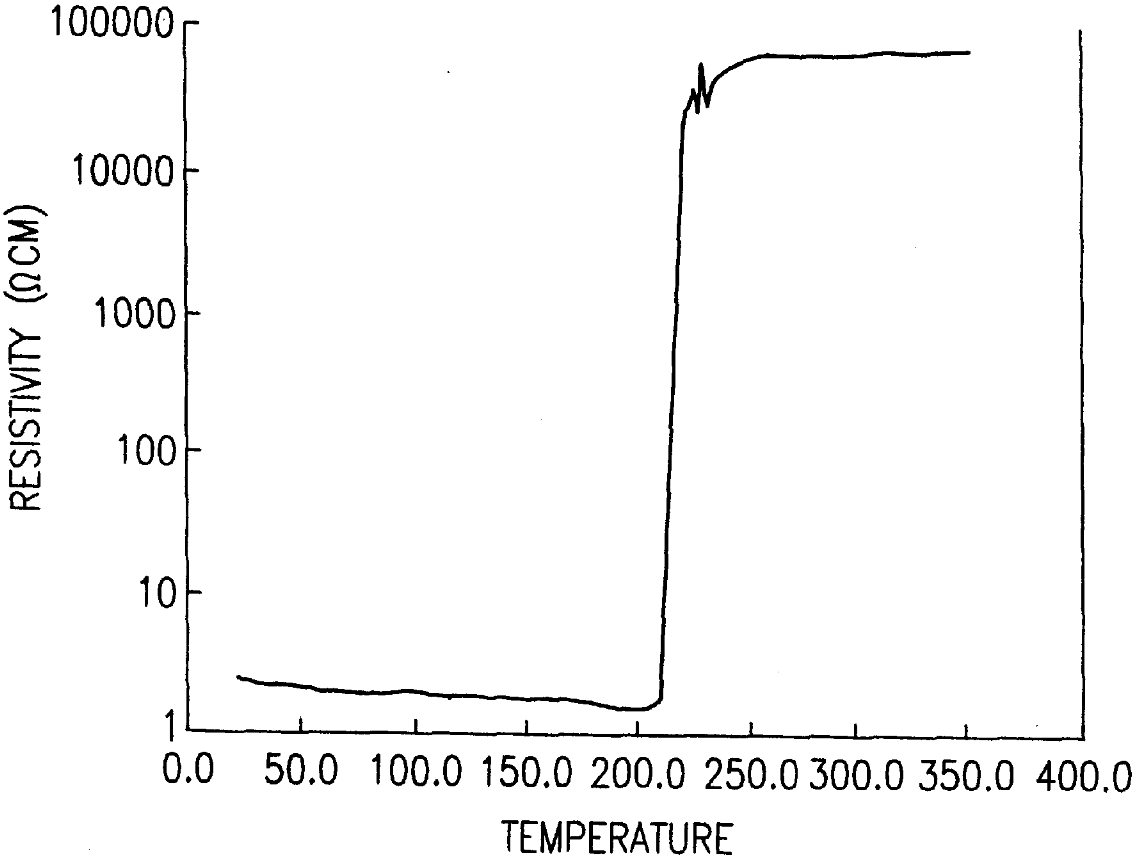
FIG. 7 is a graph showing the relationship between resistivity and device temperature for Example 2-8.
Figure 8:
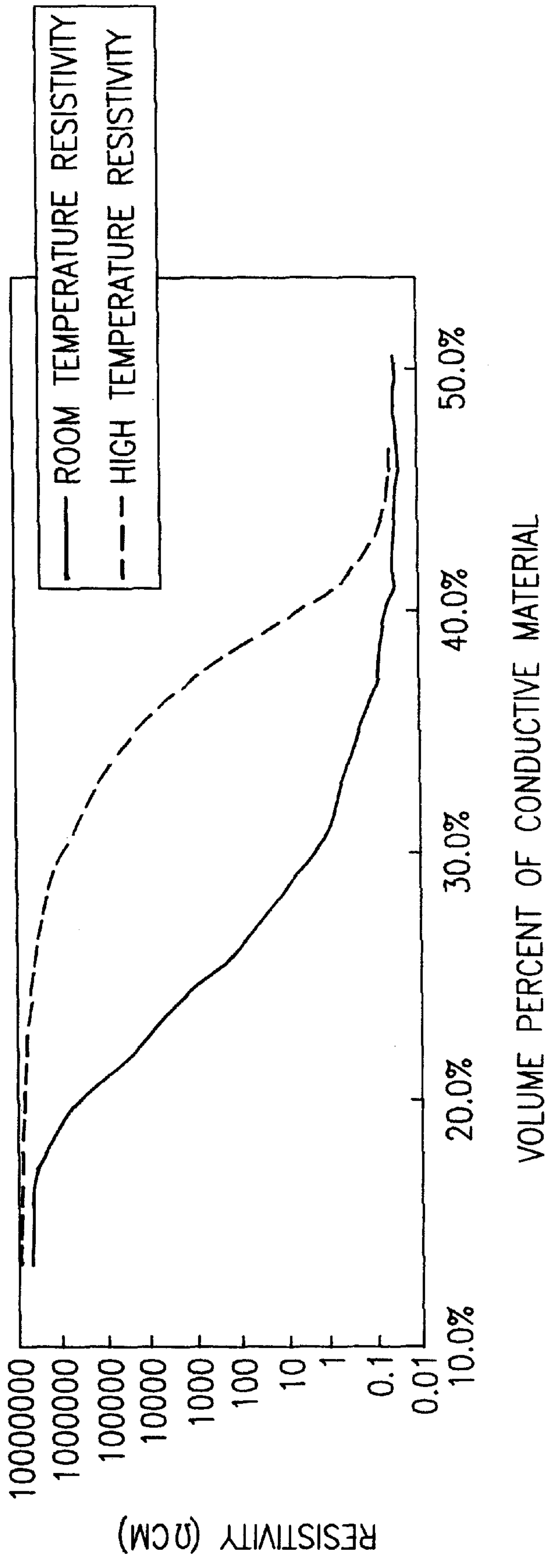
FIG. 8 is a graph showing the relationship of room temperature resistivity and high temperature resistivity as a function of conductive material volume percent for the conductive composite bodies of Examples 2-1 through 2-14.

The relationship between measured resistivity and temperature for the sintered body of Example 2-8 is shown in FIG. 7. The relationship between resistivity at room temperature and high temperature for the sintered bodies of Examples 2-1 through 2-14 is shown in FIG. 8, where the volume ratio of conductive material is plotted on the horizonal axis and resistivity on the vertical axis. Examples 2-1 through 2-4 and 2-14 through 2-18 are comparative examples, as the volume percent of conductive material in the sintered body is less than 20 vol % or more than 40 vol %.

As is clear from the results in Tables 1 and 2, only when the volume ratio of the conductive materials in the sintered body is within the range of about 20 to 40% is the ratio between high-temperature resistivity and room-temperature resistivity 10 or more (i.e., acceptable PTC properties are exhibited).

TABLE 1

| Example Number | High Electrical Resistance Material: Composition | High Electrical Resistance Material: Volume | Conductive Material: Composition | Conductive Material: Volume | Composition of Sintered Body: Conductive Material Volume | Composition of Sintered Body: Matrix Volume | Resistivity (Ω · cm): Room Temperature | Resistivity (Ω · cm): 320° C. |
|---|---|---|---|---|---|---|---|---|
| 2-1 | Alumina | 82.0% | Bi 80-Ga 20 mol % alloy | 15.0% | 13.2% | 86.8% | $4.25 \times 10^6$ | $9.45 \times 10^6$ |
| 2-2 | Alumina | 79.5% | Bi 80-Ga 20 mol % alloy | 17.5% | 15.4% | 84.6% | $4.62 \times 10^6$ | $8.01 \times 10^6$ |
| 2-3 | Alumina | 77.0% | Bi 80-Ga 20 mol % alloy | 20.0% | 17.5% | 82.5% | $3.03 \times 10^6$ | $8.52 \times 10^6$ |
| 2-4 | Alumina | 74.5% | Bi 80-Ga 20 mol % alloy | 22.5% | 19.9% | 80.1% | $5.40 \times 10^5$ | $5.50 \times 10^6$ |
| 2-5 | Alumina | 72.0% | Bi 80-Ga 20 mol % alloy | 25.0% | 21.6% | 78.4% | $4.30 \times 10^4$ | $5.26 \times 10^6$ |
| 2-6 | Alumina | 69.5% | Bi 80-Ga 20 mol % alloy | 27.5% | 24.0% | 76.0% | $3.25 \times 10^3$ | $4.78 \times 10^6$ |
| 2-7 | Alumina | 67.0% | Bi 80-Ga 20 mol % alloy | 30.0% | 26.5% | 73.5% | $7.60 \times 10^1$ | $3.21 \times 10^6$ |
| 2-8 | Alumina | 64.5% | Bi 80-Ga 20 mol % alloy | 32.5% | 28.8% | 71.2% | 8.40 | $1.82 \times 10^6$ |
| 2-9 | Alumina | 62.0% | Bi 80-Ga 20 mol % alloy | 35.0% | 30.6% | 69.4% | 1.23 | $7.25 \times 10^5$ |
| 2-10 | Alumina | 59.5% | Bi 80-Ga 20 mol % alloy | 37.5% | 33.1% | 66.9% | $6.45 \times 10^{-1}$ | $1.77 \times 10^5$ |
| 2-11 | Alumina | 57.0% | Bi 80-Ga 20 mol % alloy | 40.0% | 35.5% | 64.5% | $2.20 \times 10^{-1}$ | $1.41 \times 10^4$ |
| 2-12 | Alumina | 54.5% | Bi 80-Ga 20 mol % alloy | 42.5% | 37.4% | 62.6% | $9.40 \times 10^{-2}$ | $6.52 \times 10^2$ |
| 2-13 | Alumina | 52.0% | Bi 80-Ga 20 mol % alloy | 45.0% | 39.6% | 60.4% | $7.72 \times 10^{-2}$ | 6.20 |
| 2-14 | Alumina | 49.5% | Bi 80-Ga 20 mol % alloy | 47.5% | 41.4% | 58.6% | $4.24 \times 10^{-2}$ | $4.60 \times 10^{-1}$ |
| 2-15 | Alumina | 47.0% | Bi 80-Ga 20 mol % alloy | 50.0% | 43.6% | 56.4% | $5.40 \times 10^{-2}$ | $8.15 \times 10^{-2}$ |
| 2-16 | Alumina | 44.5% | Bi 80-Ga 20 mol % alloy | 52.5% | 46.2% | 53.8% | $3.54 \times 10^{-2}$ | $6.22 \times 10^{-2}$ |
| 2-17 | Alumina | 42.0% | Bi 80-Ga 20 mol % alloy | 55.0% | 48.2% | 51.8% | $4.01 \times 10^{-2}$ | $4.52 \times 10^{-2}$ |
| 2-18 | Alumina | 39.5% | Bi 80-Ga 20 mol % alloy | 57.5% | 50.6% | 49.4% | $3.98 \times 10^{-2}$ | $4.52 \times 10^{-2}$ |

EXAMPLE III

Alumina ceramic powders with average particle diameters of 2.2 μm, 8 μm, 20 μm and 70 μm were used as the secondary particles for the high electrical resistance material, and bismuth metal that had been atomized to an average particle diameter of 18 μm was used as the conductive material. These materials were mixed at ratios shown in Table 3.

A sintering aid of $ZnO—B_2O_3—SiO_2$ was added in an amount of 3.0% by volume. The mixture of these materials was kneaded with a vacuum kneader and, after kneading, extruded using a vacuum extrusion formation device. The extruded bodies were dried at 100° C. and then preliminarily sintered at 700° C. for 3 hours in a nitrogen gas flow of 5 l/minute. Thereafter, the bodies were primarily sintered at 1250° C. for 3 hours in the same atmosphere to form composite sintered bodies.

The volume ratios of the conductive material and the matrix material for each sintered body were measured as in Example I. The results are shown in Table 3. The sintered products obtained were processed into 5 mm×5 mm×30 mm cylinders. The direct current 4 terminal method was used to measure the resistivity of each body at room temperature (25° C.) and high temperature (320° C.). The results are shown in Table 3.

Each of the sintered bodies was cut and the exposed surface polished. Thereafter, each was photographed using a scanning electron microscope. The average diameter A of the particles of conductive material and the average distance between these particles were respectively measured by means of image analysis.

Figure 9:
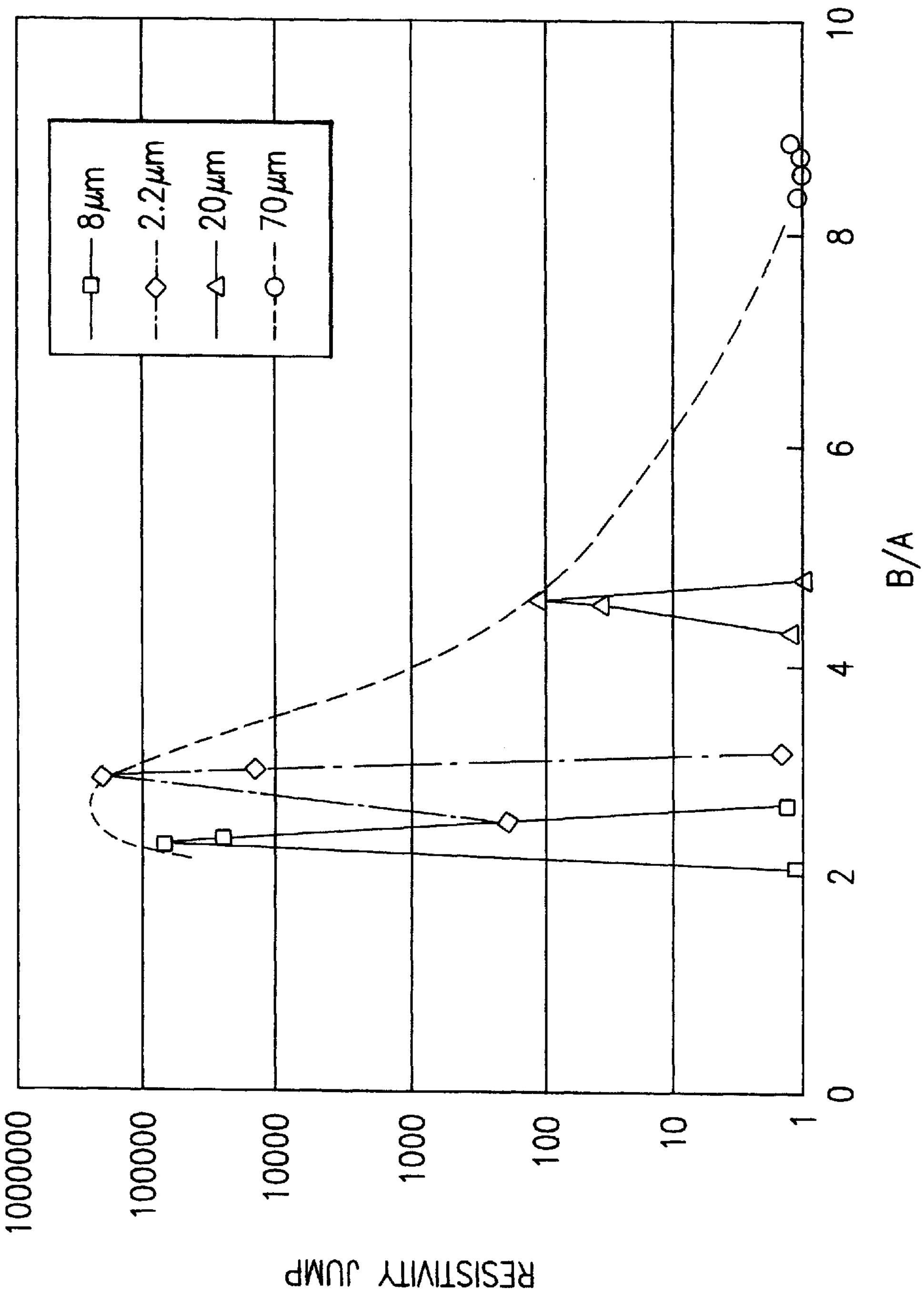
FIG. 9 is a graph showing the relationship between B/A and the ratio of room temperature and high temperature resistivity.

FIG. 9 shows the relationship between B/A and resistivity jump between room temperature (25° C.) and high temperature (320° C.). The ratio B/A is plotted on the horizontal axis and the resistivity jump on the vertical axis. As is clear from Table 3 and FIG. 9, the resistivity jump is 2 times or more when B/A is 8 or less, and even greater when B/A is 4 or less.

The composite sintered body according to the present invention is particularly suited for protecting high current electronic devices, because its room temperature resistivity is no more than 5 Ωcm and its resistivity jump can easily exceed 10. Its low room temperature resistivity also enables the formation of considerably smaller PTC devices when compared to conventional devices, even when used in applications involving large rated current. In addition, since the material out of which the sintered body is constructed is completely inorganic, the device as a whole is noncombustible. Accordingly, there is no concern of damage, as is the case with conventional polymer protective elements, due to severe or sustained overcurrent conditions.

Additionally, the trip-point temperature of the device can be changed over a wide range of temperatures (e.g., 40° C. to in excess of 350° C.) simply by changing the composition of the conductive material used in the device. As a result, the conductive composite material of the present invention is applicable as a temperature fuse element that can be used in series with a diverse group of electrical and electronic components.

TABLE 3

| Example Number | Mixing Composition: High Electrical Resistance Material: Composition | Mixing Composition: High Electrical Resistance Material: Volume | Mixing Composition: Conductive Material: Composition | Mixing Composition: Conductive Material: Volume | Sintered Body Composition: Average Diameter A of Conductive Material (μm) | Sintered Body Composition: Average Distance B Between Particles of Conductive Material (μm) | Sintered Body Composition: Ratio: B/A | Sintered Body Properties: Resistivity (Ω.cm): Room Temperature | Sintered Body Properties: Resistivity (Ω.cm): 320° C. | Sintered Body Properties: Resistivity Ratio High Temperature/Room Temperature |
|---|---|---|---|---|---|---|---|---|---|---|
| 3-1 | Alumina 2.2 μm Powder | 78.0% | Bi metal | 20.0% | 18 | 49 | 2.72 | $4.12 \times 10^6$ | $4.96 \times 10^6$ | 1.2 |
| 3-2 | Alumina 2.2 μm Powder | 73.0% | Bi metal | 25.0% | 18 | 44 | 2.44 | $1.12 \times 10^2$ | $2.76 \times 10^6$ | $2.46 \times 10^4$ |
| 3-3 | Alumina 2.2 μm Powder | 68.0% | Bi metal | 30.0% | 18 | 43 | 2.39 | 1.85 | $1.25 \times 10^5$ | $6.76 \times 10^4$ |
| 3-4 | Alumina 2.2 μm Powder | 63.0% | Bi metal | 35.0% | 18 | 38 | 2.11 | $3.12 \times 10^{-1}$ | $3.54 \times 10^{-1}$ | 1.13 |
| 3-5 | Alumina 8 μm Powder | 78.0% | Bi metal | 20.0% | 18 | 58 | 3.22 | $2.98 \times 10^6$ | $4.06 \times 10^6$ | 1.36 |
| 3-6 | Alumina 8 μm Powder | 73.0% | Bi metal | 25.0% | 18 | 56 | 3.11 | $9.50 \times 10^1$ | $1.28 \times 10^6$ | $1.35 \times 10^4$ |
| 3-7 | Alumina 8 μm Powder | 68.0% | Bi metal | 30.0% | 18 | 55 | 3.06 | 4.52 | $9.20 \times 10^5$ | $2.04 \times 10^5$ |
| 3-8 | Alumina 8 μm Powder | 63.0% | Bi metal | 35.0% | 18 | 46 | 2.56 | $8.00 \times 10^{-1}$ | $1.55 \times 10^2$ | $1.94 \times 10^2$ |
| 3-9 | Alumina 20 μm Powder | 83.0% | Bi metal | 15.0% | 18 | 87 | 4.83 | $6.50 \times 10^4$ | $6.53 \times 10^4$ | 1.00 |
| 3-10 | Alumina 20 μm Powder | 78.0% | Bi metal | 20.0% | 18 | 84 | 4.67 | $3.20 \times 10^1$ | $3.62 \times 10^3$ | $1.13 \times 10^2$ |
| 3-11 | Alumina 20 μm Powder | 73.0% | Bi metal | 25.0% | 18 | 83 | 4.61 | $2.40 \times 10^{-1}$ | 8.90 | $3.71 \times 10^1$ |
| 3-12 | Alumina 20 μm Powder | 68.0% | Bi metal | 30.0% | 18 | 78 | 4.33 | $8.56 \times 10^{-2}$ | $1.12 \times 10^{-1}$ | 1.31 |
| 3-13 | Alumina 70 μm Powder | 83.0% | Bi metal | 15.0% | 18 | 160 | 8.89 | $2.12 \times 10^6$ | $2.56 \times 10^6$ | 1.21 |
| 3-14 | Alumina 70 μm Powder | 78.0% | Bi metal | 20.0% | 18 | 158 | 8.78 | 3.12 | 3.54 | 1.13 |
| 3-15 | Alumina 70 μm Powder | 73.0% | Bi metal | 25.0% | 18 | 155 | 8.61 | $6.52 \times 10^{-2}$ | $6.61 \times 10^{-2}$ | 1.01 |
| 3-16 | Alumina 70 μm Powder | 68.0% | Bi metal | 30.0% | 18 | 152 | 8.44 | $3.24 \times 10^{-2}$ | $3.61 \times 10^{-2}$ | 1.11 |

While the present invention has been particularly shown and described with reference to the preferred mode as illustrated in the drawing, it will be understood by one skilled in the art that various changes in detail may be effected therein without departing from the spirit and scope of the invention as defined by the claims.

What is claimed is:

1. A conductive composite sintered body exhibiting PTC behavior, said body comprising:

an electrically insulating matrix; and 20 vol %–40 vol % electrically conductive particles dispersed in said matrix to form an electrically conducting three-dimensional network therethrough, said particles being selected from the group consisting of bismuth, gallium, or alloys thereof, an average distance between said particles, when viewed in an arbitrary cross-section through the sintered body, being no more than 8 times the average particle diameter of said particles;

wherein the resistivity of said sintered body is no more than 5 Ω·cm at temperatures below the melting point of said electrically conductive material and increases substantially at or above said melting point.

2. The conductive composite sintered body of claim 1, wherein said average distance is no more than 4.

3. The conductive composite sintered body of claim 1, wherein the resistivity of said sintered body is at least 1 kΩcm at or above said melting point.

4. The conductive composite sintered body of claim 2, wherein the resistivity of said sintered body is at least 1 kΩcm at or above said melting point.

5. The conductive composite sintered body of claim 1, wherein said matrix comprises an inorganic material.

6. The conductive composite sintered body of claim 5, wherein said inorganic material is selected from the group consisting of ceramic oxides, ceramic nitrides, silicate glasses, borate glasses, phosphate glasses and aluminate glasses.

7. The conductive composite sintered body of claim 6, wherein said ceramic oxides include at least one of alumina, silica, magnesia and mullite.

8. The conductive composite sintered body of claim 6, wherein said ceramic nitrides include aluminum nitride and silicon nitride.

9. The conductive composite sintered body of claim 5, wherein said inorganic material is selected from the group consisting of sodium silicate glass, potassium borate glass and sodium phosphate glass.

10. The conductive composite sintered body of claim 1, wherein the average particle diameter of said conductive particles ranges from 5 μm to 100 μm.

11. The conductive composite sintered body of claim 1, wherein said conductive particles shrink, at the melting point temperature thereof, at least 0.5%.

12. The conductive composite sintered body of claim 1, wherein the ratio of the resistivity value at 25° C. and the resistivity value at 300° C. of said sintered body is at least 10.

13. The conductive composite sintered body of claim 1, wherein said electrically conductive particles are present in an amount of 25 vol % to 35 vol %.

* * * * *